Figure 1:
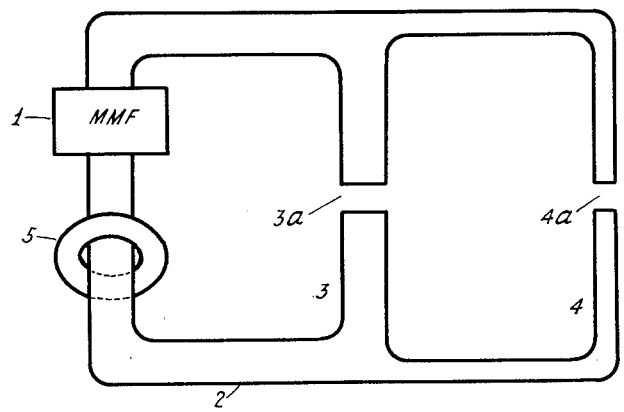

May 8, 1934.  J. L. FINCH  1,957,765

MAGNETOMOTIVE FORCE CIRCUIT

Filed March 14, 1931

INVENTOR
JAMES L. FINCH
BY
ATTORNEY

Patented May 8, 1934

1,957,765

UNITED STATES PATENT OFFICE 1,957,765

MAGNETOMOTIVE FORCE CIRCUITS

James L. Finch, Patchogue, N. Y., assignor to Radio Corporation of America, a corporation of Delaware Application March 14, 1931, Serial No. 522,602

6 Claims. (Cl. 179—115.5)

This invention relates to magneto-motive circuits and in particular to a novel means for producing a magnetic field of constant intensity by means of magneto-motive force which may vary in amplitude.

It is sometimes desirable to obtain a steady magnetic flux from a source of electrical energy which is subject to variations in amplitude or to pulsations. For example, in loud speakers of the dynamic type the field coil is often energized by current derived from a rectifier fed from an alternating current source. The rectified current includes alternating current components superposed upon the direct current. These components may result in a fluctuating field of flux in the gap in which the moving coil is situated.

The primary object of this invention is to provide a novel method and circuit whereby a field of constant magnetic force may be obtained from an electrical force which may vary in amplitude.

Figure 2:
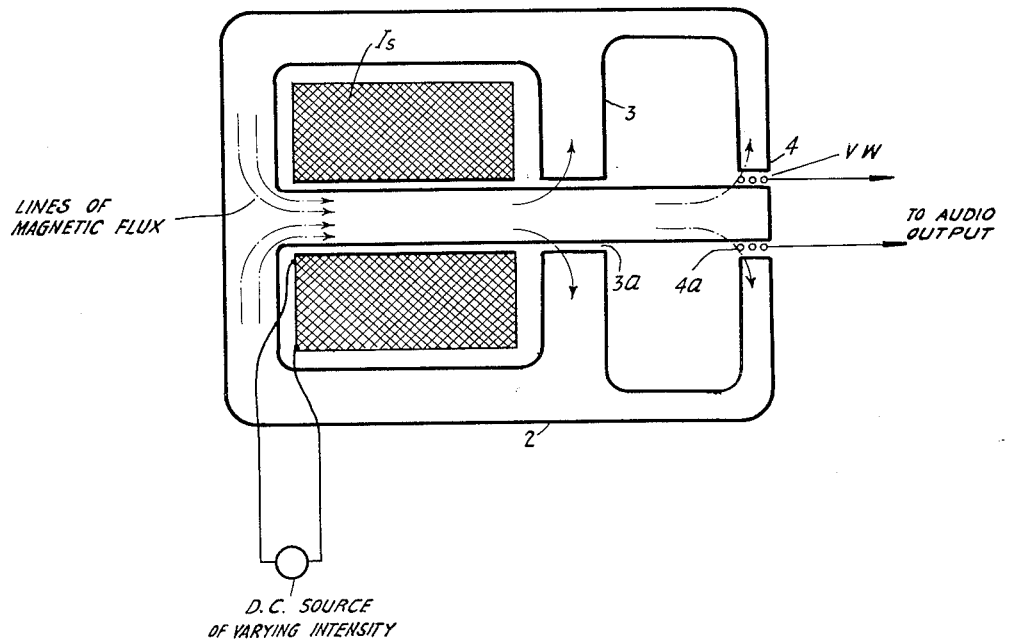

This is accomplished by providing in circuit with the driving force two magneto-motive force circuits of different characteristics, one of which is saturated at normal current and the other of which is not saturated at normal current. In the circuit which is saturated at normal current no flux variations or field strength force variations will result from a change of amplitude in the energy from the driving source. Numerous subsidiary objects and advantages, and the manner in which they are attained, will be apparent from the specification and therefrom when read in connection with the drawing in which:

Figure 1 shows, merely for purposes of illustration, a magneto-motive force circuit including parallel branches; while The circuit in Figure 2 illustrates one application of applicant's invention.

In Figure 1 a source of magneto-motive force 1 is shown in series with a path in which the field or flux produced by the source 1 may flow. A portion of the path 2 has a relatively large cross section capable of carrying a large magnetic field without saturating. The path 2 is completed through two parallel branch circuits 3 and 4. The branch circuit 3 has an airgap 3a such as to give this portion of the magnetic path relatively high permeability. The cross section area of this path is sufficient to prevent saturation of the path during normal operation of the driving force. The path 4 is of relatively small cross sections, the cross sections being such as to give low magnetic permeability and the path is composed of material which will become saturated at a value of magnetomotive force lower than the minimum magnetomotive driving force from 1. This path has an airgap 4a.

In operation the constants of the magnetic circuit are so chosen that the path 4 will become saturated at a value of magnetomotive force lower than the minimum to be expected from source 1. The length of path 4 is so great that combined with this low magnetic reluctance the flux will not change appreciably due to variations in the magnetomotive force from 1. Thus when the magnetomotive force increases an increase in the flux through airgap 3a will take place but no increase in the flux through airgap 4a will occur. The flux through path 4a may be used for many purposes. An example of this use is dynamic loud speakers in which the speaker winding moves in an airgap as shown in Figure 2. Obviously, if the flux in said airgap is constant better results will be obtained from the loud speaker whereas if the flux field in which the winding moves is of varying density movement of the winding due to forces other than those caused by the audio frequency current in the winding will take place and the force tending to move the coil will no longer be proportional to the current in that coil, as required, but will also vary with the intensity of the field flux.

The magnetomotive force may be produced by any desired means, for example, by pulsating current derived through a rectifier from an alternating current source. In case the source of magnetoforce 1 drops clear to zero at times it may be advantageous to introduce an auxiliary source, as indicated at 5, which will combine with the original source 1 so as to prevent the flux from actually going to zero. This should be accomplished without the necessity of an additional source of electrical power. This is accomplished in accordance with the present invention by placing short-circuiting conductors around path 2, as indicated at 5. These conductors in a falling of the potential of the main source 1 set up a counter electromotive force which prevents the magnetic field from falling to zero in case energy from the main source 1 fluctuates.

One application of the invention is illustrated in Figure 2 in which the circuit 2 is the core of a dynamic speaker and the source 1s is the field winding of said speaker mounted on the core or path 2. The circuit of high permeability 3 is in parallel, as in Figure 1, with the circuit 4 of low permeability which is saturated during normal operation. The moving coil VW, in which voice current flows and which is connected to the output of the audio frequency amplifier, is mounted for free movement in the airgap 4a located in the saturated circuit 4. The winding $1_s$ may be energized from any source which supplies either pulsating current or direct current.

In operation any amplitude variations appearing in $1_s$ from the source will appear in circuit 3 but will not appear in circuit 4. The winding VW in circuit 4 will not be affected by alternating current components appearing in the source and in $1_s$. Obviously, a dynamic loud speaker arranged as illustrated in Figure 2 will be free from any noises due to the alternating current components on the current traversing the field exciting winding S.

Although, for purposes of illustration, I have shown the present modificaton of my invention, it is understood that I do not intend to be limited by such showing except by the claims appended hereto.

Having thus described my invention and the operation thereof, what I claim is:

1. The combination of a magnetomotive force circuit comprising magnetic material having two parallel branches, each including an air gap, one of which branches is saturated and the other of which branches is not saturated, and a voice current energized winding mounted in the field of the saturated branch of said circuit.

2. A loudspeaker magnetomotive circuit comprising an external core, an internal core, a field winding interposed between said external core and said internal core, a central branch in said external core of relatively high permeability to provide a non-saturated path at normal currents in said field winding, a second branch in said external core adjacent said central branch of relatively low permeability to provide a saturated path at normal currents in said field winding, and a moving coil interposed within an airgap between said internal core and said second branch.

3. A loudspeaker magnetomotive circuit comprising an external core, a central core, a field winding adapted for a direct current source of varying intensity interposed between said external core and said central core, a central branch in said external core of relatively high permeability to provide a non-saturated path at normal currents in said field winding, a second branch in said external core adjacent said central branch of relatively low permeability to provide a saturated path at normal currents in said field winding, and a movable voice coil interposed within an airgap between said central core and said second branch.

4. A loudspeaker magnetomotive circuit comprising an external core, a field winding to provide a magnetic field adapted for a direct current source of varying intensity located within said external core, a central branch in said external core of relatively large cross sectional area to provide a nonsaturated path at normal currents in said field winding, a second branch in said external core adjacent said central branch of relatively small cross sectional area to provide a saturated path at normal currents in said field winding, a movable voice coil within an airgap of said second branch, and a plurality of short-circuiting conductors arranged with said external core to set up a counter electro-motive force to prevent the magnetic field from falling to zero should the energy supplying said field winding fluctuate.

5. The combination of a magnetomotive force circuit comprising a core of magnetic material having two branches of magnetic material each including an air gap, one of which branches the said magnetic material is saturated, the other of which the said magnetic material is non-saturated, and a fixed coil in the field of said non-saturated branch and a moving coil in said saturated branch.

6. The combination of a magnetomotive force circuit comprising an interrupted conductive path having a common portion and two parallel branches, one of said branches being saturated, and an energized moving coil in the field of the saturated branch of said circuit and a fixed coil adjacent the said other branch.

JAMES L. FINCH.